UNITED STATES PATENT OFFICE.

HEINRICH KRIEGSHEIM, OF BERLIN, GERMANY, ASSIGNOR TO THE PERMUTIT COMPANY, OF NEW YORK, N. Y., A CORPORATION OF DELAWARE.

PURIFICATION OF WATER.

1,197,640.   Specification of Letters Patent.   Patented Sept. 12, 1916.

No Drawing.   Application filed August 11, 1914.   Serial No. 856,284.

*To all whom it may concern:*

Be it known that I, HEINRICH KRIEGSHEIM, a citizen of the German Empire, residing at Berlin, in Germany, have invented certain new and useful Improvements in Purification of Water, of which the following is a specification.

This invention relates to the purification of water; and it comprises a method of purifying water wherein such water is treated with a free halogen, such as chlorin, (or with a chlorin-yielding substance, such as hypochlorite) is filtered over or through a pervious or minutely porous material, or over or through a material consisting of or comprising an oxid of a metal having two or more states of oxidation, such as the oxid of iron, of nickel, of cobalt, of manganese, of cerium, of lead, etc. and adapted to catalyze conversion of such free halogen into other bodies; such minutely pervious material being advantageously a zeolite or zeolitic material of natural or artificial origin and such zeolite also advantageously comprising one or more such oxid; all as more fully hereinafter set forth and as claimed.

Chlorin has long been used for antiseptic and disinfectant purposes, and of late it has also been gaining favor as a means of sterilizing potable water. For this purpose chlorin is sometimes used as such, the gas or a solution of it, being directly introduced into the water to be treated, but more frequently, and especially in large scale work, it is employed in the form of a hypochlorite such as calcium hypochlorite ("bleaching powder"). Occasionally hypochlorites, or hypochlorous acid, formed by electrolysis of a chlorid solution, are employed, the electrolyzed solution being added to the water. For the present purposes the three ways are equivalents, since, in accordance with well understood reactions, the final results in high dilution of a chlorin solution or a hypochlorite solution are much the same. As to whether the active agent in sterilization is chlorin itself, hypochlorous acid or oxygen, is not here important.

Instead of chlorin, and chlorin evolving compounds, other halogens are sometimes employed. Bromin and hypobromates are used, especially for field purposes; and iodin is also sometimes used.

Chlorin and chlorin-evolving preparations are extremely active sterilizing agents, effectually killing all the bacteria and other organisms of water. Even a highly contaminated water after addition of a surprising small amount of chlorin is rendered safe from a sanitary point of view. Chlorin however has no substantial purifying power in water apart from its lethal value in killing organisms; it does not affect turbidity or hardness or lessen the dissolved solids. Nor, in the high dilutions used in sterilizing, is its oxidizing power as rapid as desirable.

In using chlorin it cannot of course be employed in the exact amount necessary; the amount corresponding to the chlorin-absorbing power of the bacteria and other organic matters present. Naturally, amounts less than this cannot be safely employed. It is therefore always used in some excess, that is, there is always more chlorin put into the water than can be absorbed and converted by the organic matter present. This excess of chlorin however is a source of considerable difficulty since it does not tend to disappear rapidly at common temperatures and in the absence of sunlight. In chlorin-sterilization therefore elaborate measures must always be taken to get rid of this necessary excess; as by aerating the water, allowing it to rest in shallow pools, etc. The necessity for this after-treatment has militated against the use of chlorin, advantageous as such use would otherwise appear.

For a number of hours after a chlorin treatment, this excess of chlorin (or its oxygen compounds) can readily be detected in the water. For one thing there is always a "chlorin taste" which many people find highly objectionable. Water containing chlorin or hypochlorite is also quite corrosive on metal service pipes and fittings. I have found however that I can obtain all the advantages of chlorin sterilization without these disadvantages by employing a simple after-treatment which consists in rapidly passing the treated water through or over materials of minutely pervious nature; as by filtering it through or trickling it over such materials. Conversion of the chlorin (or hypochlorous acid) into harmless and non-noticeable substances is rapid and complete. For this purpose it is best to employ materials which while completely pervious (being for instance dyed throughout by such dyestuffs as methylene blue) are nevertheless devoid of visible pores. Such materials exert a rapid catalyzing action upon dissolved chlorin and hypochlorites by which these bodies disappear and free oxygen is formed. This oxygen is taken up by oxidizable matters or liberated in the free state as the case may be. The chlorin is converted into hydrochloric acid, or, rather, chlorids. As stated, the amount of chlorin which is added to water is usually extraordinarily minute and the amount of hydrochloric acid formed therefrom and corresponding thereto can usually be completely taken up by the amount of bases present in most waters or those added, as in using bleaching powder, eau de Javelle, etc. The chlorids formed, in this dilution, of course cannot be detected by the taste.

The reactions by which the chlorin disappears may be represented empirically,

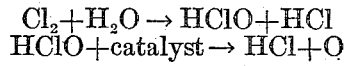

In the first reaction chlorin is converted by hydrolysis into hypochlorous and hydrochloric acids. The hypochlorous acid is catalyzed into hydrochloric acid and oxygen by the catalyst. The oxygen disappears by oxidation of the organic matters which are always present. The hydrochloric acid in turn disappears by union with the lime and magnesia compounds which are also always present, forming harmless and, in this dilution, tasteless calcium and magnesium chlorids. Where bleaching powder is used as a sterilizing agent calcium compounds are, of course, always present. The best materials I have found for this purpose are the substances known as "zeolites" or "exchange silicates," of natural or artificial origin; and now in common use for softening water. These zeolites are made as minutely pervious granules having the power of softening hard water by exchanging the soda they contain for dissolved lime or magnesia. After use they are revivified by treatment with a salt solution which takes up the lime or magnesia, or both and replaces it or them in the zeolite with soda. I have found that these zeolites have also an extraordinary catalytic power in removing dissolved chlorin as such from water, the water passing through a bed evincing no further reaction for, or taste of, free chlorin even with rapid filtration. The amount of total chlorin (that naturally present and that added in sterilization) is the same in the water passing to the zeolite and that passing beyond; but the effluent contains neither free chlorin nor hypochlorites. The use of these zeolites offers the convenience that sterilization by chlorin, and softening, can be combined in one operation; and that bleaching powder can be used in sterilization without adding to the hardness of the water.

As explained ante, in the catalysis the chlorin is usually converted into magnesium and calcium chlorids. The magnesium and calcium of these chlorids in passing through zeolites are removed and are replaced by sodium, giving sodium chlorid, which in this dilution is tasteless.

The same effect of rapid and complete removal of free chlorin or hypochlorous acid may be attained by the use of catalytic oxids of metals having more than one stage of oxidation, such as the oxids of lead, iron, cerium, nickel, copper, cobalt, etc. The higher oxids of these metals catalyze the conversion of chlorin and hypochlorous acid into other bodies, harmless for the present purposes. The action does not change the oxid save in that if the original material contain the lower oxids they are at once converted into the higher. Only minute or catalytic quantities of these oxids are necessary. They are also best used in a minutely pervious condition since the action here, as in the case of zeolites, is a surface phenomenon; a phenomenon depending, to a large degree, upon the surface exposed to the water. For this reason where the oxids are used as such they are best used in connection with a porous carrier; being for example precipitated on or in such a material as pumice stone, kieselguhr, etc. While the general action of these oxids in quickly converting free chlorin or hypochlorous acid is the same, the action differs in detail and this difference may be utilized in modifying the present process for various purposes. With manganese and iron oxids, the oxygen liberated in the reaction of chlorin with water appears as ozone or hydrogen peroxid. With oxids of lead, cerium, copper, nickel or cobalt the oxygen appears as ordinary oxygen; and, on the other hand, these oxids have the power of destroying ozone or hydrogen peroxid which may occur in the water, either as a result of the chlorin treatment or as a result of an after treatment with manganese oxid. They also, of course have the power of destroying dissolved ozone or hydrogen peroxid which may gain access to the water in other ways as in sterilizing with ozone or peroxid. Another variation of my method, particularly advantageous for slightly turbid, impure water, consists in developing permanganic acid or permanganates (formed with the bases present) therein at the expense of the residual chlorin. For this purpose the chlorin-containing water is first transmitted through a mixture of nickel and manganese oxids. This results in a violet color in the liquid, due to the formation of permanganic acid. The resulting flocculation and formation of manganese oxids by the oxidation of organic matter by the permanganate (which is a very quick and energetic oxidizer) carries down turbidity. Any residual permanganic acid may be removed by filtration over reduced manganese oxids.

As will be perceived, in the methods just described the residual chlorin from chlorin sterilization is utilized for additional purifying actions.

While I have hereinbefore described the use of pervious, or microscopically-pored materials, the best being zeolites, and the use of these oxids in the alternative, the two may, and very advantageously, be used together; the oxids being employed as part of the base of the zeolites, replacing a corresponding amount of lime, or soda, as the case may be. Materials of this character may be readily prepared by treating ordinary artificial or other zeolites with the chlorids or other salts of the particular metal which is to be used. For example, by filtering a dilute solution of nickel chlorid through an ordinary zeolite the latter may be caused to take up any desired amount of nickel existing as a base in combination with alumina and silica and replacing a corresponding amount of soda or lime. Cobalt zeolite, manganese zeolite, iron zeolite, cerium zeolite, copper zeolite, etc., may be prepared in this way. For a lead zeolite, it is best to use lead acetate or nitrate. These zeolites may be used in the same way as that described for the oxids; and work much more effectually for the same amount of oxid since, in effect, a relatively small amount of oxid may be thereby given a relatively enormous surface of exposure to the water.

Where a water contains dissolved compounds of oxidizable oxids such as manganese or iron bicarbonate, the previously described methods allow their easy and rapid removal since the catalytic conversion of the free chlorin at the same time accelerates enormously the oxidation of these oxids which, otherwise, would take place only relatively slowly. With such waters, simple pervious bodies, such as the ordinary zeolites, are sufficient, though of course oxid-containing zeolites may also be used.

For removal of free chlorin, of hypochlorous acid, of ozone and of hydrogen peroxid, the nickel-containing zeolite is upon the whole the best material.

Any of the described methods may be applied to water which has been treated with the other halogens, bromin or iodin, with hypobromates or with iodates.

In one advantageous embodiment of the present invention I utilize the high disinfecting and oxidizing power of ozone. As stated, while chlorin is an active lethal agent for micro-organisms its oxidizing action is often not so rapid as can be desired; and particularly with waters containing much organic matter. With these waters, ozone is a more vigorous and rapid oxidant. Therefore in this embodiment of my invention I take water which has been treated with chlorin or other halogen and which still contains residual halogen, and pass it through a manganese zeolite in the manner previously described. This results in the formation of ozone or hydrogen peroxid in the water. This ozone is allowed to exert its action on the water for a time and then the water is sent through a filter containing a cobalt or nickel zeolite, or cobalt or nickel oxid. Nickel oxid or nickel zeolite is particularly advantageous. This now breaks up any residual ozone or hydrogen peroxid, with evolution of free oxygen.

The whole process may be continuous, the water containing chlorin, hypochlorite, etc., being sent first through a filter containing oxidized manganese zeolite (a zeolite containing higher manganese oxids) then allowed to flow through a conduit of large cross section to give a certain amount of time for interaction between the ozone and the organic matter and thence being sent through a filter bed of nickel zeolite. As stated, the zeolites may also be used for softening the water at the same time.

While I have particularly described this invention as applicable to the treatment of water treated with halogens such as chlorin, or their oxids, it may also be applied to the treatment of waters containing ozone. The use of ozone for purifying water has become somewhat general, but, like chlorin, a portion of the ozone is apt to remain in the water treated, imparting to it a rough taste which is not liked, the property of corroding pipes, etc.

The exchange silicates and the oxids stated have the same converting action upon ozone that they have upon chlorin and other halogens, causing it to disappear rapidly and completely from water sent through or over such silicates or oxids.

What I claim is:—

1. The process of treating water which comprises sterilizing the same with chlorin and thereafter filtering over minutely pervious silicate material.

2. The process of treating water which comprises sterilizing the same with a halogen and thereafter filtering over minutely pervious silicate material.

3. The process of treating water which comprises sterilizing the same with a halogen and thereafter filtering over an exchange silicate.

4. The process of treating water which comprises sterilizing the same with chlorin and thereafter filtering over an exchange silicate.

5. The process of treating water which comprises sterilizing the same with chlorin and thereafter filtering over an exchange silicate containing an oxid of a metal having two stages of oxidation.

6. The process of treating water which comprises sterilizing the same with a halogen and thereafter filtering over an exchange silicate containing an oxid of a metal having two stages of oxidation.

7. The process of treating water which comprises sterilizing the same with chlorin and thereafter filtering over an exchange silicate containing nickel oxid.

8. In the treatment of water, the process which comprises sterilizing such water with chlorin and thereafter filtering over minutely pervious material comprising an oxid of a metal having two stages of oxidation and in the higher state of oxidation.

9. In the treatment of water the process which comprises sterilizing such water with a halogen and thereafter filtering over minutely pervious material comprising an oxid of a metal having two stages of oxidation and in the higher state of oxidation.

10. In the treatment of water, the process which comprises sterilizing such water with chlorin and thereafter filtering over minutely pervious material comprising oxid of nickel.

11. In the purification of water the process which comprises treating such water with a halogen, filtering the treated water over minutely pervious material comprising manganese oxid and thereafter filtering over material comprising nickel oxid.

12. The process of purifying water which comprises treating the water with a halogen, filtering such water over material comprising a catalytic oxid capable of replacing the excess of halogen by an actively oxidizing oxygen-containing substance and then removing such substance by filtration over material comprising another catalytic metal oxid.

13. In the purification of water the process which comprises treating such water with a halogen, filtering the treated water over silicate material comprising manganese oxid and thereafter filtering over silicate material comprising nickel oxid.

14. The process of purifying water which comprises treating the water with chlorin, filtering the treated water over an exchange silicate comprising a catalytic oxid capable of replacing an excess of chlorin by an actively oxidizing oxygen containing substance and then removing such substance by a further filtration of the treated water over an exchange silicate comprising another catalytic metal oxid.

In testimony whereof, I affix my signature in the presence of two subscribing witnesses.

HEINRICH KRIEGSHEIM.

Witnesses:
J. G. TALMAGE,
BRENNAN B. WEST.